April 18, 1933. G. A. BARTHOLOMEW 1,904,775
ENGINE
Filed Nov. 16, 1931 5 Sheets-Sheet 1
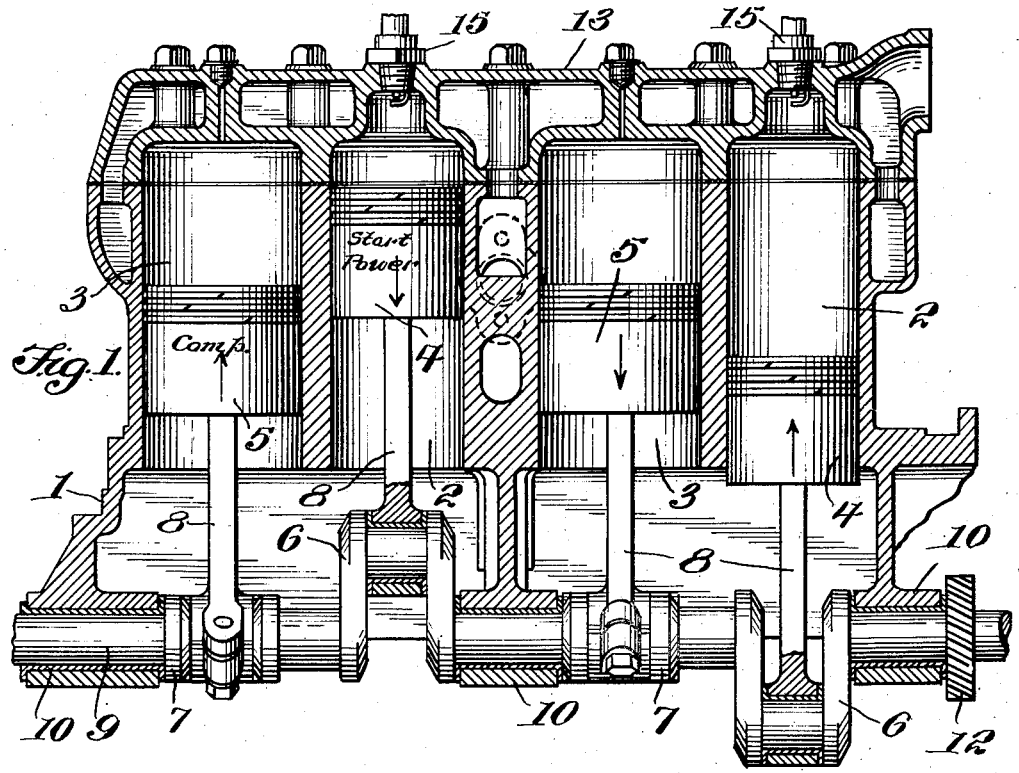
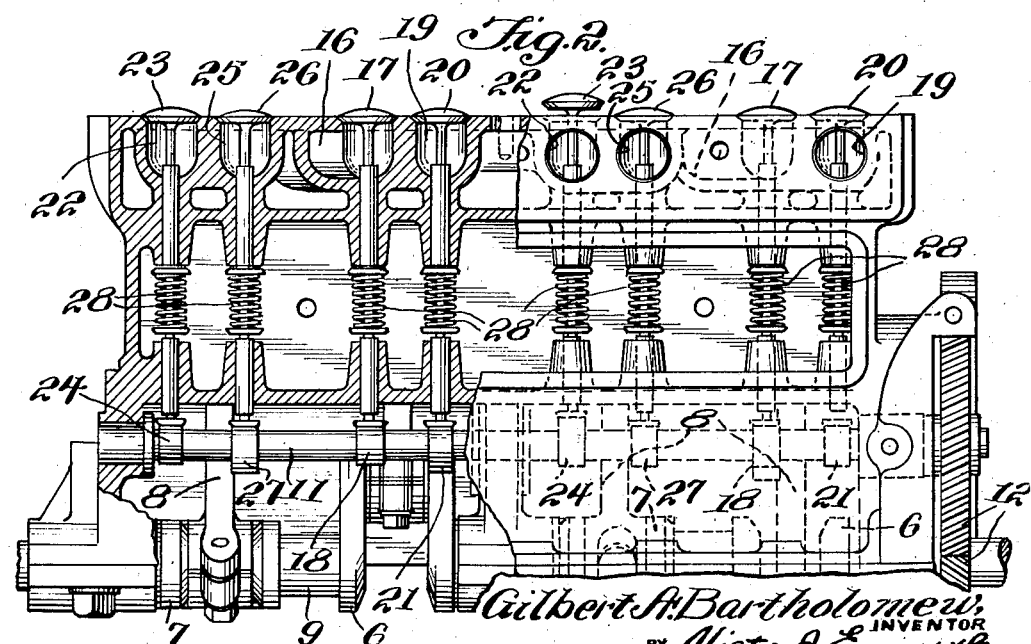
Gilbert A. Bartholomew,
INVENTOR
BY Victor J. Evans & Co.
ATTORNEY
WITNESS: J. T. K. Wright April 18, 1933.  G. A. BARTHOLOMEW  1,904,775

ENGINE

Filed Nov. 16, 1931    5 Sheets-Sheet 2

Gilbert A. Bartholomew, INVENTOR

BY Victor J. Evans & Co.
ATTORNEY

WITNESS: J. T. L. Wright

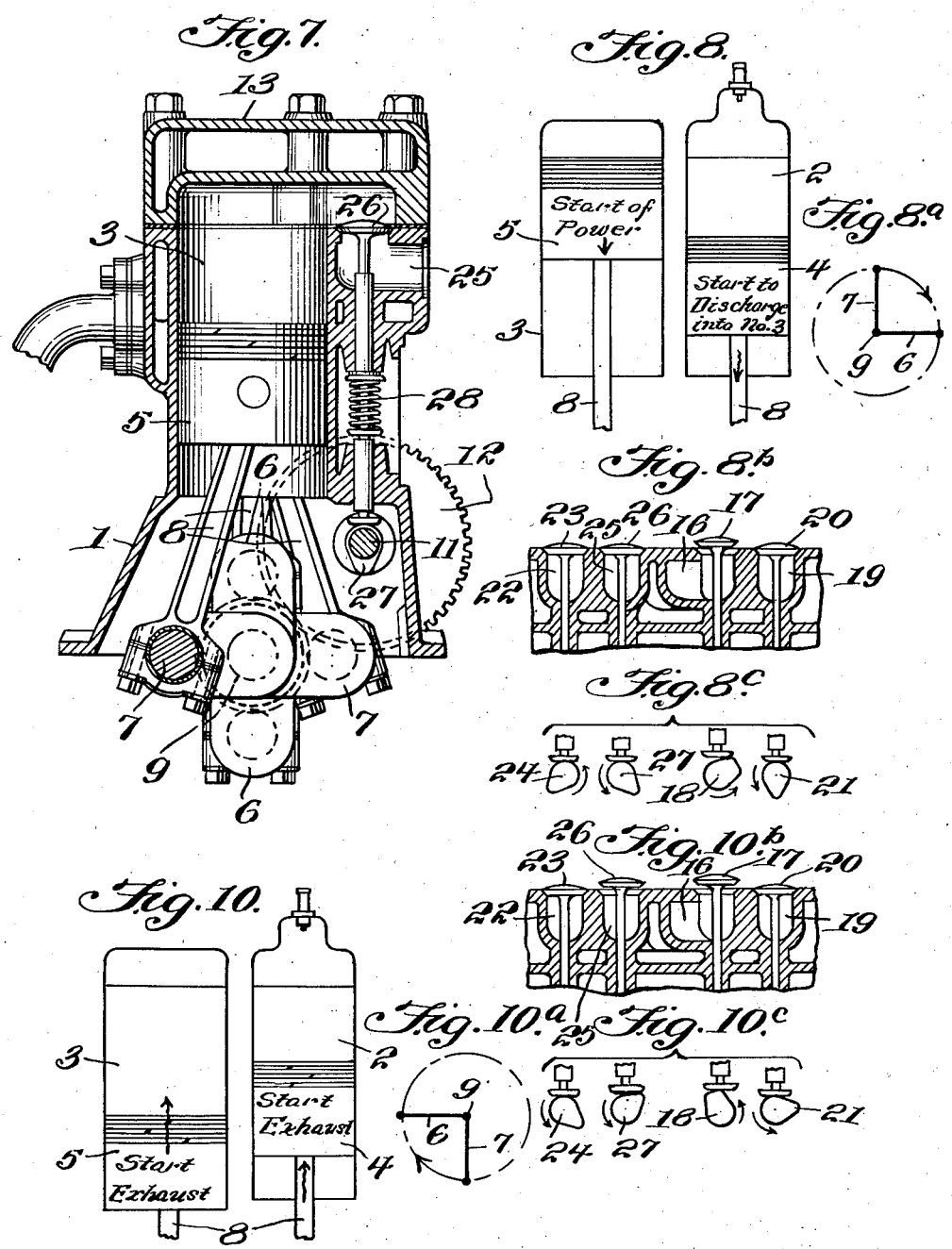

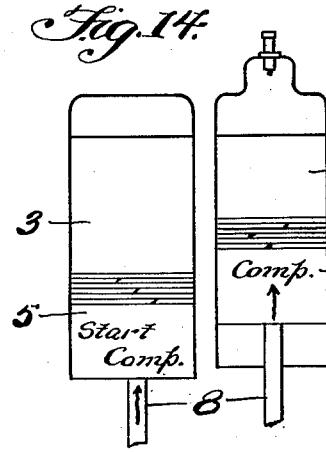
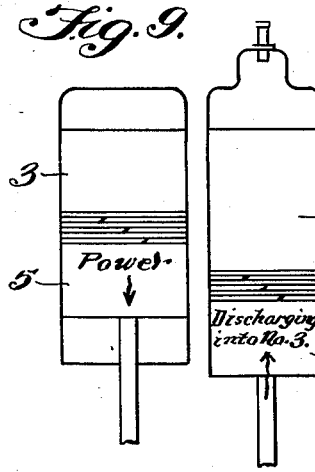
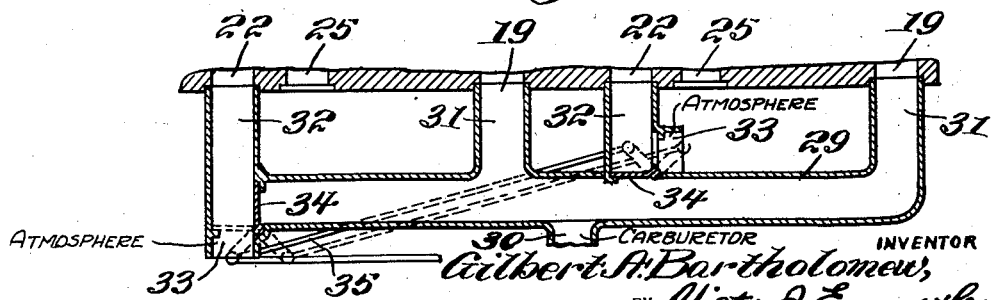

April 18, 1933. G. A. BARTHOLOMEW 1,904,775
ENGINE
Filed Nov. 16, 1931   5 Sheets-Sheet 5
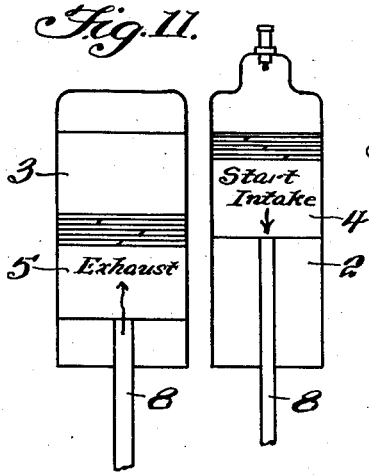
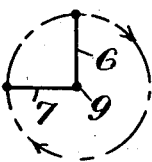
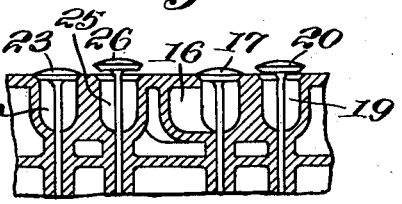
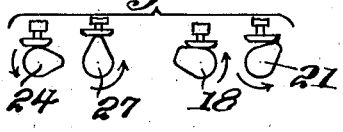
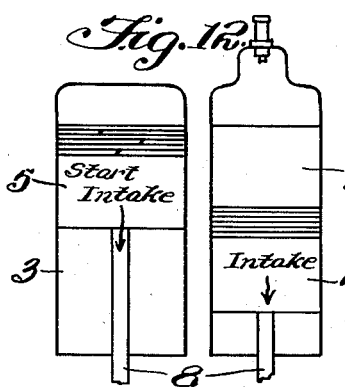
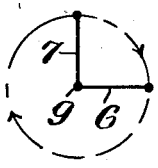
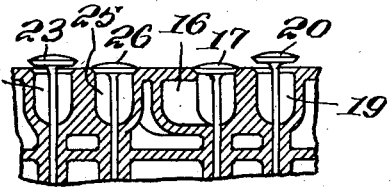
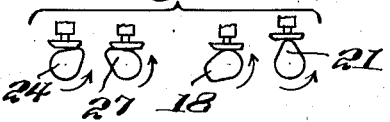
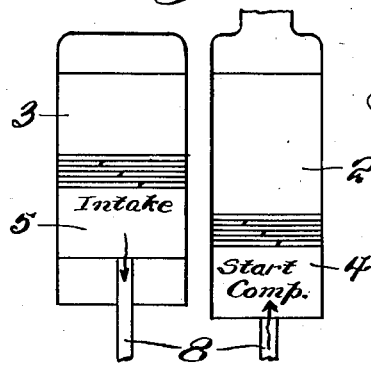
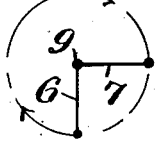
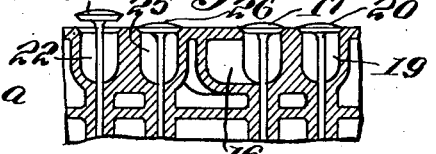
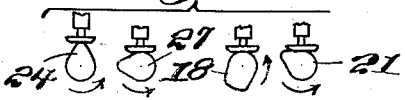
Gilbert A. Bartholomew, INVENTOR
BY Victor J. Evans & Co.
ATTORNEY Patented Apr. 18, 1933

1,904,775

UNITED STATES PATENT OFFICE

GILBERT A. BARTHOLOMEW, OF CLEVELAND, OHIO

ENGINE

Application filed November 16, 1931. Serial No. 575,423.

This invention relates to a compound explosion engine of the internal combustion four cycle type and has for the primary object, the provision of means whereby compressed air may be heated and supplied after the explosion takes place to provide better combustion to the burning fuel or gases and provide driving force to the pistons of the engine for a greater distance of travel of the respective pistons during each explosion and thereby produce a smoother running engine with less vibration than heretofore obtainable from conventional types of engines.

Another object of this invention is the provision of an air compressing cylinder and a piston therefor, for each explosion cylinder of the engine and communicative therewith and valve controlled so that compressed air may be introduced to the burning gases or fuel for augmenting the latter to give a second expansion and permit said burning gases to heat the compressed air to increase the expansion thereof for action on the pistons of the air compressing cylinders for increasing the power of the engine.

A further object of this invention is the provision of means for compressing the air at the time of the highest pressure created by the explosion.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating an engine constructed in accordance with my invention.

Figure 2 is a fragmentary vertical sectional view illustrating the engine with the cylinder head removed and showing the valve mechanism.

Figure 7 is a transverse sectional view taken on the line 7—7 of Figure 3.

Figure 8 is a diagrammatical view illustrating the relative positions of the pistons of the air compressing and explosion cylinders.

Figure 8a is a companion view showing the relative positions of the cranks of the crank shaft when the pistons are in the position shown in Figure 8.

Figure 8b is a fragmentary sectional view showing the positions of the valves when the pistons are in the position shown in Figure 8.

Figure 8c is a diagrammatical view showing the positions of the cams for the valves when the pistons occupy the positions shown in Figure 8.

Figure 9 is a diagrammatical view showing the relative positions of the pistons of the air compressing and explosion cylinders during the approximate completion of the power stroke and the piston of the explosion cylinder starting on the scavenging stroke.

Figure 9a is a companion view to Figure 9 showing the relative positions of the cranks of the crank shaft when the pistons are positioned as shown in Figure 9.

Figure 9b is a fragmentary sectional view showing the relative positions of the valves when the pistons are positioned as shown in Figure 9.

Figure 9c is a diagrammatical view showing the relative positions of the cams of the valves when the pistons are positioned as shown in Figure 9.

Figure 10 is a diagrammatical view illustrating the pistons of the air compressing and explosion cylinders when on the scavenging stroke of the engine.

Figure 10a is a companion view to Figure 10 showing the relative position of the cranks of the crank shaft when the pistons are in the position shown in Figure 10.

Figure 10b is a fragmentary sectional view illustrating the position occupied by the valves when the pistons are positioned as shown in Figure 10.

Figure 10c is a diagrammatical view illustrating the positions of the cams of the valves when the pistons are in the position as shown in Figure 10.

Figure 11 is a diagrammatical view showing the air compressing and explosion cylinders with their pistons positioned when the engine is starting to draw fuel into the explosion cylinder.

Figure 11a is a companion view showing the relative position of the cranks of the crank shaft when the pistons are positioned as shown in Figure 11.

Figure 11b is a fragmentary sectional view showing the relative positions of the valves when the pistons are in a position as shown in Figure 11.

Figure 11c is a diagrammatical view showing the relative position of the cams when the pistons are positioned as shown in Figure 11.

Figure 12 is a diagrammatical view showing the relative positions of the pistons in the air compressing and explosion cylinders when the engine is in the act of drawing fuel into the explosion cylinder and air into the air compressing cylinder.

Figure 12a is a companion view of Figure 12 showing the relative position of the cranks of the crank shaft when the pistons are as shown in Figure 12.

Figure 12b is a fragmentary sectional view showing the relative position of the valves when the pistons are disposed as shown in Figure 12.

Figure 12c is a diagrammatical view showing the relative positions of the cams of the valves when the pistons are positioned as shown in Figure 12.

Figure 13 is a diagrammatical view showing the relative position of the pistons when the engine is in the act of drawing air into the air cylinder and starting to compress the fuel within the explosion chamber.

Figure 13a is a companion view to Figure 13 showing the relative position of the cranks of the crank shaft when the pistons are disposed as shown in Figure 13.

Figure 13b is a fragmentary sectional view showing the relative positions of the valves when the pistons are positioned as shown in Figure 13.

Figure 13c is a diagrammatical view showing the relative positions of the cams of the valves when the pistons are positioned as shown in Figure 13.

Figure 14 is a diagrammatical view showing the relative position of the pistons of the air compressing and explosion cylinders when the engine is compressing both the air and the fuel.

Figure 14a is a companion view to Figure 14 showing the relative position of the cranks of the crank shaft when the pistons are positioned as shown in Figure 14.

Figure 14b is a fragmentary sectional view showing the relative position of the valves when the pistons occupy the positions shown in Figure 14.

Figure 14c is a diagrammatical view showing the relative positions of the cams of the valves when the pistons are positioned as shown in Figure 14.

Figure 15 is a fragmentary sectional view illustrating the modification whereby explosive fuel or air may be introduced to the air compressing cylinders.

Figure 3:
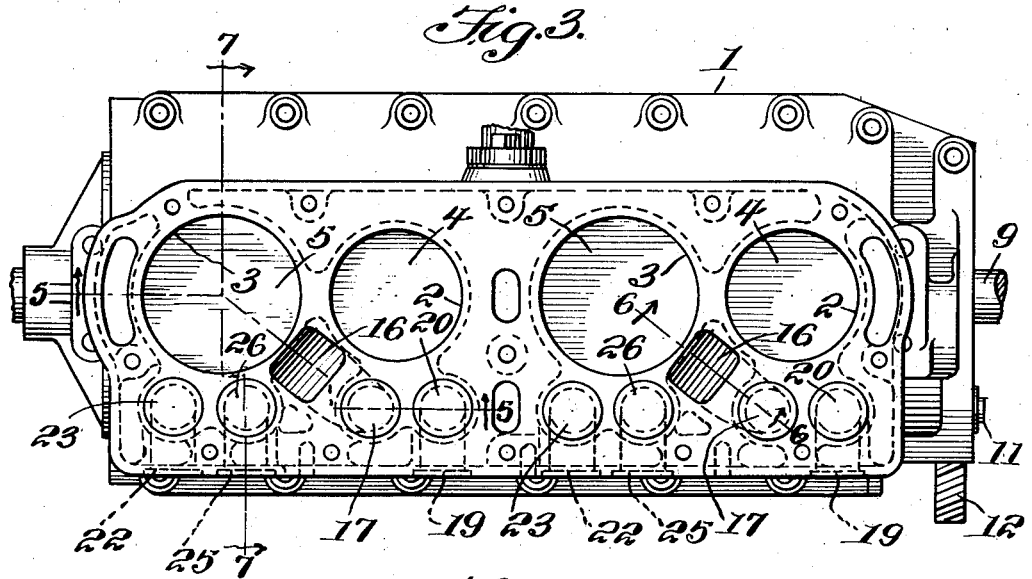
Figure 3 is a top plan view illustrating the cylinder block with the head removed and showing the communicative passages between the air compressing cylinders and the explosion cylinders.
Figure 4:
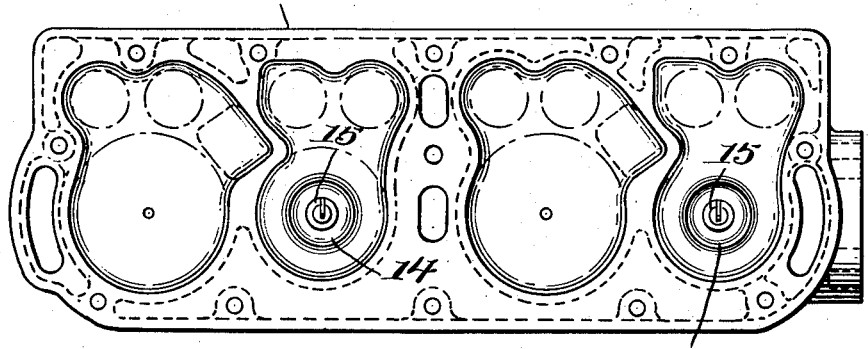
Figure 4 is a plan view illustrating the head.
Figure 5:
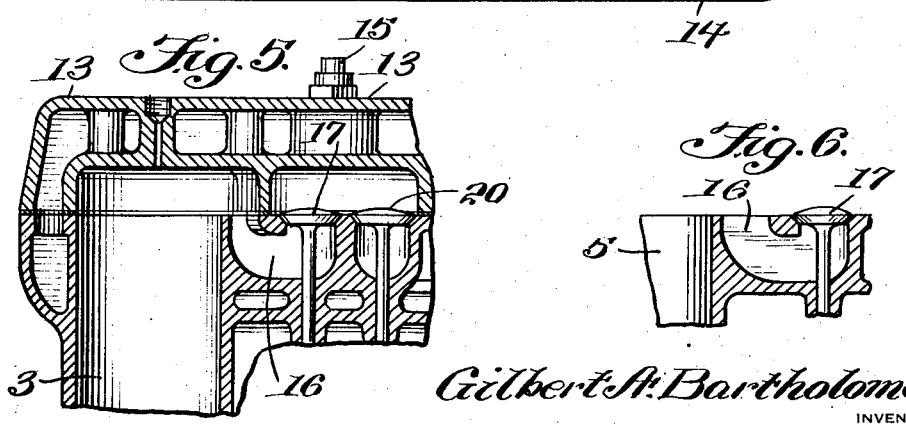
Figure 5 is a fragmentary sectional view taken on the line 5—5 of Figure 3.
Figure 6:
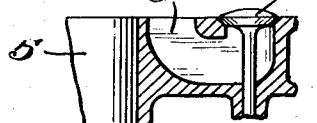
Figure 6 is a fragmentary sectional view taken on the line 6—6 of Figure 3.

Referring in detail to the drawings, the numeral 1 indicates a crank case or base of the engine carrying explosion cylinders 2 and air compressing cylinders 3. Reciprocally mounted within the cylinders 2 and 3 are pistons 4 and 5 connected to cranks 6 and 7 by connecting rods 8. The cranks 6 and 7 form integral parts of a crank shaft 9 journalled in bearings 10 of the base or crank case 1. As shown in Figure 1, the engine comprises a pair of explosion cylinders and a pair of air compressing cylinders, however, the number of cylinders may be increased as desired or an engine may be constructed with a single explosion cylinder and a single air compressing cylinder and operate on the same principle as the type of engine shown in Figure 1. It is to be understood that the crank shaft is provided with a suitable fly wheel and is connected to a cam shaft 11 by timing gears 12 so that the ratio of the cam shaft will be one to two of the crank shaft.

The upper ends of the cylinders are closed by a removable head 13 in which are formed chambers 14 communicating with the explosion cylinders 2 and have associated therewith spark plugs 15. The cylinders and head are water jacketed as shown in Figure 1. The air compressing cylinders 3 are of a larger size than the combustion cylinders. Each combustion cylinder 2 is in communication with a companion air compressing cylinder by a passage 16 controlled by a valve 17, the latter actuated by a cam 18 of the cam shaft 11. Each explosion cylinder 2 is provided with a fuel intake port 19 controlled by an intake valve 20 operated by a cam 21 on the cam shaft 11. The fuel intake ports 19 are connected to a fuel intake manifold so that fuel may be introduced into the explosion cylinders on the suction strokes of the pistons 4.

Each air compressing cylinder is provided with an air intake port 22 in communication with the atmosphere and controlled by a valve 23 actuated by a cam 24 on the cam shaft 11. Each air compressing cylinder 3 is also provided with an exhaust port 25 controlled by an exhaust valve 26 actuated by a cam 27 on the cam shaft 11. The valves heretofore described are of the poppet type normally urged into seated position by springs 28. It is to be understood that the spark plugs are connected to a suitable ignition system (not shown) so as to ignite the fuel within the explosion cylinders when the pistons thereof reach approximately their uppermost position to start on their power strokes.

The cranks of the crank shaft are so arranged that the pistons 4 of the explosion cylinders are advanced one half of a stroke over the pistons 5 of the air compressing cylinder and the operation of the engine is as follows, and reference specifically to one explosion cylinder and its companion air compressing cylinder is though sufficient for all.

When explosion takes place in the explosion cylinder the piston 4 thereof moves downwardly under the influence of the expansion of the gases and the piston 5 in the air compressing cylinder is moved upwardly to compress air therein and when the piston 4 of the explosion cylinder reaches approximately one half of its downward stroke as shown in Figure 8, the piston 5 of the air compressing cylinder has completed its compression stroke and at this instant the cam 18 opens the control valve 17 to establish communication between the cylinders 2 and 3. The burning gases pass through the passage 16 to heat the compressed air and cause an expansion thereof and the compressed air also mixes with the burning gases in the explosion cylinder 2 to augment the explosion creating a second power impulse to the piston 4 or causes a more thorough burning of the gases and consequently expansion thereof so that pressure of the piston 4 will be for a greater distance of travel of said respective piston 4 than heretofore possible to obtain from conventional types of engines with one explosion. The piston 4 continues to move downwardly on its power stroke and the piston 5 starts on its downward power stroke under the influence of the expanding compressed air within the air compressing cylinder 3. After the piston 4 of the explosion cylinder reaches its lowermost position it starts upwardly as shown in Figure 9 and the valve 17 still remaining open, the spent gases in the explosion cylinder 2 pass into the air compressing cylinder 3, the piston 5 thereof being still travelling in a downward direction on its power stroke as shown in Figure 9 and due to the air compressing cylinder being of a greater diameter than the explosion cylinder 2, a very small amount of resistance will be offered to the upward movement of the piston 4 by the back pressure. As the piston 5 reaches its lowermost position and starts upwardly on its scavenging stroke as shown in Figure 10, the exhaust valve 26 opens placing both cylinders 2 and 3 in communication with the atmosphere so that the burnt gases within said cylinders may escape to the atmosphere by the time that the pistons 4 and 5 have completed their scavenging strokes. The piston 4 of the explosion cylinder 2 when reaching its uppermost position of its scavenging stroke, the control valve 17 closes and the piston 5 of the air compressing cylinder has then completed approximately one half of its scavenging stroke. The piston 4 is then starting down on its suction stroke as shown in Figure 11 and the intake fuel valve opens admitting fuel to the explosion cylinder and as the piston 5 of the air compressing cylinder 3 reaches its uppermost position on its scavenging stroke as shown in Figure 12, the exhaust valve 26 closes and the air intake valve 23 opens so that on the next downward movement of the piston 5 as shown in Figure 12, air will be drawn into the air compressing cylinder. As the piston 4 of the explosion cylinder 2 reaches its lowermost position on the suction stroke as shown in Figure 13 the fuel intake valve 20 closes so that on the piston 4 moving upwardly on its compression stroke as shown in Figure 14, the fuel therein will be compressed ready for igniting when said piston 4 starts on its power stroke. When the piston 5 reaches its lowermost position on its suction stroke the air intake valve 23 closes so that when the piston 5 moves upwardly on its compression stroke as shown in Figure 14, the air confined within the air compressing cylinder will be compressed, thus it will be seen that the foregoing description sets forth a complete operation of the engine and that the burning gases or fuel will receive air under pressure during the final movement of the piston 4 on its power stroke for the purpose of augmenting the explosion and thereby provide an additional impulse on the piston 4 from a single explosion and also that the compressed air will be heated to cause a greater expansion thereof for action on the piston 5 of the air compressing cylinder.

Referring to my modified form of invention as shown in Figure 15, an intake manifold 29 is provided and the leg 30 thereof is adapted to be associated with a suitable carburetor while the legs 31 are connected to the fuel intake ports 19 of the explosion cylinders 2. Legs 32 are connected to the intake ports 22 of the air compressing cylinders 3. The legs 32 besides being in communication with the manifold 29 are also in communication with the atmosphere by ports 33 and associated with the legs 32 and their ports 33 are gate valves 34 and the latter are connected together by a tie rod 35 for the purpose of causing said gate valves to move in unison. It being understood that the rod 35 has pivotal connection with arms on the gate valves and that the rod may be operated through any suitable medium. When the gate valves are in one position they close the legs 32 to the manifold 29 and open said legs to the atmosphere and when the gate valves are in their other position they close the legs 32 to the atmosphere and open said legs 32 to the manifold so that fuel may be drawn into the air compressing cylinders instead of air. By introducing fuel to the air compressing cylinders, the operation of the engine will be substantially the same as heretofore described except that when the valves 17 open to establish communication between the respective explosion cylinders and air compressing cylinders that the fuel compressed within the air compressing cylinders will be ignited and the expansion of the gases of said fuel will act on the pistons 5 consequently permitting the engine to develop a large amount of power.

While I have shown and described the preferred embodiment of my invention, it will be understood that minor changes in construction, combination and arrangement of parts may be made without departing from the spirit and scope of my invention, as claimed.

Having thus described my invention, what I claim is:

An internal combustion engine comprising a base, an explosion cylinder on said base, a compressor cylinder on said base, a crank shaft carried by said base, pistons in said cylinders, means for connecting the pistons to the crank shaft so that the piston of the explosion cylinder travels in advance of the piston of the compressor cylinder, said explosion cylinder having a fuel intake port, said compressor cylinder having intake and exhaust ports, valve means for said ports, a conduit between the cylinders, a control valve for said conduit and adapted to establish communication between said cylinders during the explosion of fuel within the explosion cylinder, means actuated by the crank shaft for operating the valve means of the ports for the explosion cylinder, a fuel manifold connected to the intake port of the compressor cylinder and the fuel port of the explosion cylinder, and means whereby fuel may be admitted to the cylinders from the manifold or whereby a portion of the manifold may be closed to prevent the admission of fuel to the compressor cylinder and establish communication between the latter and the atmosphere so that air may be drawn into the compressor cylinder instead of fuel.

In testimony whereof I affix my signature.

GILBERT A. BARTHOLOMEW.